(12) United States Patent
Takabayashi

(10) Patent No.: US 6,630,858 B1
(45) Date of Patent: Oct. 7, 2003

(54) NONCONTACT INTERFACE CIRCUIT AND METHOD FOR CLAMPING SUPPLY VOLTAGE THEREIN

(75) Inventor: Yasutaka Takabayashi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 44 days.

(21) Appl. No.: 09/616,071

(22) Filed: Jul. 13, 2000

(30) Foreign Application Priority Data

Jan. 31, 2000 (JP) ........................................ 2000-022218

(51) Int. Cl.[7] ................................................ G05F 1/10
(52) U.S. Cl. ........................ 327/538; 327/540; 327/427
(58) Field of Search ................................ 327/78, 87, 88, 327/89, 540, 541, 543, 542, 309, 538, 539, 427, 531; 323/220, 223, 225, 226, 265, 270, 281, 303, 313

(56) References Cited

U.S. PATENT DOCUMENTS

| | | | | |
|---|---|---|---|---|
| 4,095,164 A | * | 6/1978 | Ahmed | 323/226 |
| 4,720,997 A | * | 1/1988 | Doak et al. | 327/78 |
| 5,070,538 A | * | 12/1991 | Milberger et al. | 323/270 |
| 5,578,960 A | * | 11/1996 | Matsumura et al. | 327/535 |
| 5,703,415 A | * | 12/1997 | Tanaka | 323/265 |
| 5,867,015 A | * | 2/1999 | Corsi et al. | 323/316 |
| 5,994,887 A | * | 11/1999 | Tokuda | 323/313 |
| 6,002,295 A | * | 12/1999 | Gens et al. | 327/546 |

* cited by examiner

Primary Examiner—Terry D. Cunningham
Assistant Examiner—Long Nguyen
(74) Attorney, Agent, or Firm—Rabin & Berdo, P.C.

(57) ABSTRACT

A supply voltage is divided to provide a divided supply voltage. The divided supply voltage is compared with the reference voltage. The supply voltage is controlled based on the result of comparison so that the supply voltage does not exceed a predetermined breakdown voltage.

34 Claims, 13 Drawing Sheets

DISTANCE BETWEEN COUPLER AND IC CARD

DISTANCE BETWEEN COUPLER AND IC CARD

DISTANCE BETWEEN COUPLER AND IC CARD

NONCONTACT INTERFACE CIRCUIT AND METHOD FOR CLAMPING SUPPLY VOLTAGE THEREIN

CROSS REFERENCE TO RELATED APPLICATION

This application claims the priority of Application No. 2000-22218, filed Jan. 31, 2000 in Japan, the subject matter of which is incorporated herein by reference.

TECHNICAL FIELD OF THE INVENTION

The present invention relates to a contactless (noncontact) interface circuit for contactless data transmission and a method for clamping a supply voltage; and more particularly to, a contactless (noncontact) interface circuit that controls a supply voltage for application to an internal circuit so that the supply voltage does not exceed a breakdown voltage.

BACKGROUND OF THE INVENTION

In recent years, contactless (noncontact) IC cards have been developed and put to use. A conventional IC card includes, as shown in FIG. 1, a receiving/rectifying circuit, which receives voltage (alternating voltage) supplied from a coil in a coupler and rectifies the received voltage. The conventional IC card further includes a high supply voltage clamp circuit, which controls a power-supply voltage generated by the receiving/rectifying circuit so that the supply voltage does not exceed the breakdown voltage of circuit elements in the IC card. The high supply voltage clamp circuit includes diode-connected N type MOS transistors N1 to Nn and a controlling NMOS transistor, which turns on when a( predetermined voltage is applied to a node, and starts a clamping operation. Such a predetermined voltage is applied to the node, when the supply voltage becomes higher than the threshold voltages (breakdown voltages) of the N type MOS transistors N1 to Nn.

The threshold voltage of the N type MOS transistors N1 to Nn are uneven due to structure unevenness thereof. As a result, when the threshold voltage of the N type MOS transistors N1 to Nn shifts too low a value the clamping operation starts even if the a supply voltage is not yet high enough, so that undesirable electric current flows therethrough. Therefore, the transmission distance of electric power between the coil in the coupler and the coil in the IC card is shortened. On the other hand, when the threshold voltage of the N type MOS transistors N1 to Nn shift to too high a value, the clamping operation does not start even if the supply voltage becomes higher than the breakdown voltage of the inner circuit elements of the IC, so that an over voltage is applied to the circuit elements in the IC card. As a result, the circuit elements in the IC card may be damaged.

It is possible to reject defective IC cards in which N type MOS transistors N1 to Nn have uneven threshold voltages, however, the yield rate is decreased because many IC cards may be rejected.

OBJECTS OF THE INVENTION

Accordingly, an object of the present invention is to provide a contactless (noncontact) interface circuit that starts a clamping operation of a supply voltage accurately at an appropriate timing.

Another object of the present invention is to provide a method for clamping a supply voltage, in which a clamping operation starts accurately at an appropriate timing.

Additional objects, advantages and novel features of the present invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

According to a first aspect of the present invention, a contactless interface circuit includes a supply voltage generating circuit (10) which generates a supply voltage (V1);

a reference voltage generating circuit (20) which generates a predetermined reference voltage (V2);

a resistance circuit (22), provided with a dividing point (A) at which the supply voltage (V1) is divided, the voltage at the dividing point (A) being identical to the reference voltage (V2) when the supply voltage (V1) is identical to a predetermined clamp voltage (V0);

a decision circuit (A1) which detects whether the voltage at the dividing point (A) in the resistance circuit (22) reaches the reference voltage (V2); and a control circuit (H10) which controls the supply voltage in response to an output signal of the decision circuit (A1) so that the supply voltage (V1) does not exceed a predetermined breakdown voltage.

In the resistance circuit a resistance value is determined so that the dividing point voltage corresponds to the reference voltage (V2), when the supply voltage (V1) is detected to be identical to the clamp voltage (V0). The decision circuit (A1) detects whether or not the dividing point voltage increases and reaches the reference voltage (V2).

The control circuit (H10) controls the supply voltage (V1) in response to the output of the decision circuit (A1) so that the supply voltage (V1) becomes lower than a predetermined breakdown voltage.

According to a second aspect of the present invention, a method for clamping a supply voltage (V1) for contactless interface includes the steps of: providing a clamp voltage (V0); providing a reference voltage (V2); dividing the supply voltage (V1) to provide a divided supply voltage; comparing the divided supply voltage with the reference voltage (V2); and controlling the supply voltage (V1) based on the result of the comparison so that the supply voltage (V1) does not exceed a predetermined breakdown voltage.

According to a third aspect of the present invention, a contactless IC card is provided with the contactless interface circuit, according to the first aspect of the present invention.

DETAILED DISCLOSURE OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient details to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and scope of the present inventions is defined only by the appended claims.

Figure 1:
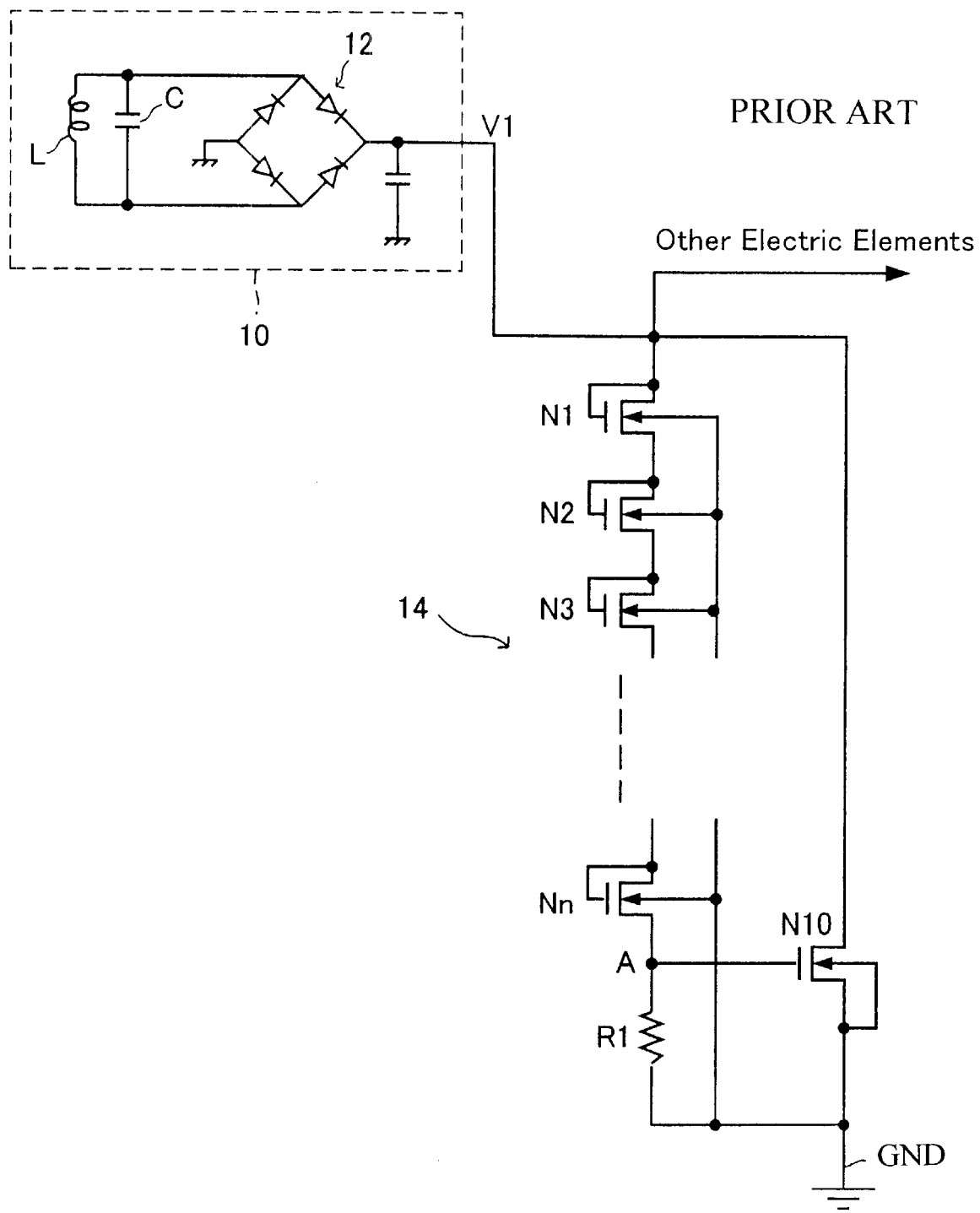
FIG. 1 is a block diagram showing a part of a conventional IC card.

For better understanding of the present invention, a conventional technology is first described. FIG. 1 shows a part of a conventional IC card. The IC card includes a receiving/rectifying circuit 10, which receives a voltage (alternating voltage) supplied from a coil in a coupler, not shown, and rectifies the received voltage to produce at an output terminal a power supply voltage V1; and a high supply voltage clamp circuit 14, which controls the power-supply voltage V1 generated by the receiving/rectifying circuit 10 so that the voltage V1 does not exceed the breakdown voltage of circuit elements in the IC card.

The receiving/rectifying circuit 10 includes a coil L, which receives the alternating voltage supplied from the coupler; a capacitor (condenser) C, which smoothes the alternating voltage received by the coil L; and a rectifying circuit 12, composed of four bridge-connected diodes. The coil L, capacitor C and rectifying circuit 12 are connected in parallel. The receiving/rectifying circuit 10 is connected to the other circuit elements in the IC card so that the circuit 10 is used as a power supply.

The high supply voltage clamp circuit 14 includes diode-connected N type MOS transistor N1 to Nn; an N type MOS transistor N10, which controls the clamping operation of the supply-voltage V1; and a pull down resistance R1. The N type MOS transistor N10 controls the electric current supplied from the power supply (receiving/rectifying circuit 10) so that it flows toward the MOS N10 transistor itself, so that the supply voltage V1 is dropped or decreased to a value lower than the breakdown voltage of the IC card circuit elements. The N type MOS transistor Nn is connected at a source to a node A, which is connected to ground terminal GND through the resistance R1. The N type MOS transistor N10 is connected at a drain to the power supply, at a grate to the node A, and at a source to the ground GND.

The N type MOS transistor N10 turns on when a predetermined voltage is applied to the node A, and starts the clamping operation. Namely, the clamping operation starts when the predetermined voltage is applied to the node A. Such a predetermined voltage is applied to the node A, when the supply voltage V1 becomes higher than the threshold voltages (breakdown voltages) of the N type MOS transistors N1 to Nn.

The threshold voltages of the N type MOS transistor N1 to Nn are uneven due to structural unevenness thereof. As a result, when the threshold voltages of the N type MOS transistors N1 to Nn shift to too low a value, the clamping operation starts even if the supply voltage V1 is not yet high enough, so that undesirable electric current flows therethrough. Therefore, the transmission distance of electric power between the coil in the coupler and the coil L in the IC card is shortened. On the other hand, when the threshold voltages of the N type MOS transistors N1 to Nn shift to too high a value, the clamping operation does not start even if the supply voltage V1 becomes higher than the breakdown voltage of the circuit elements in the IC, so that an over voltage is applied to the circuit elements. As a result, the circuit elements in the IC card may be damaged.

It is possible to reject defective IC cards in which N type MOS transistors N1 to Nn have uneven threshold voltages, however, the yield rate would be remarkably decreased because many IC cards may be rejected.

Figure 2:
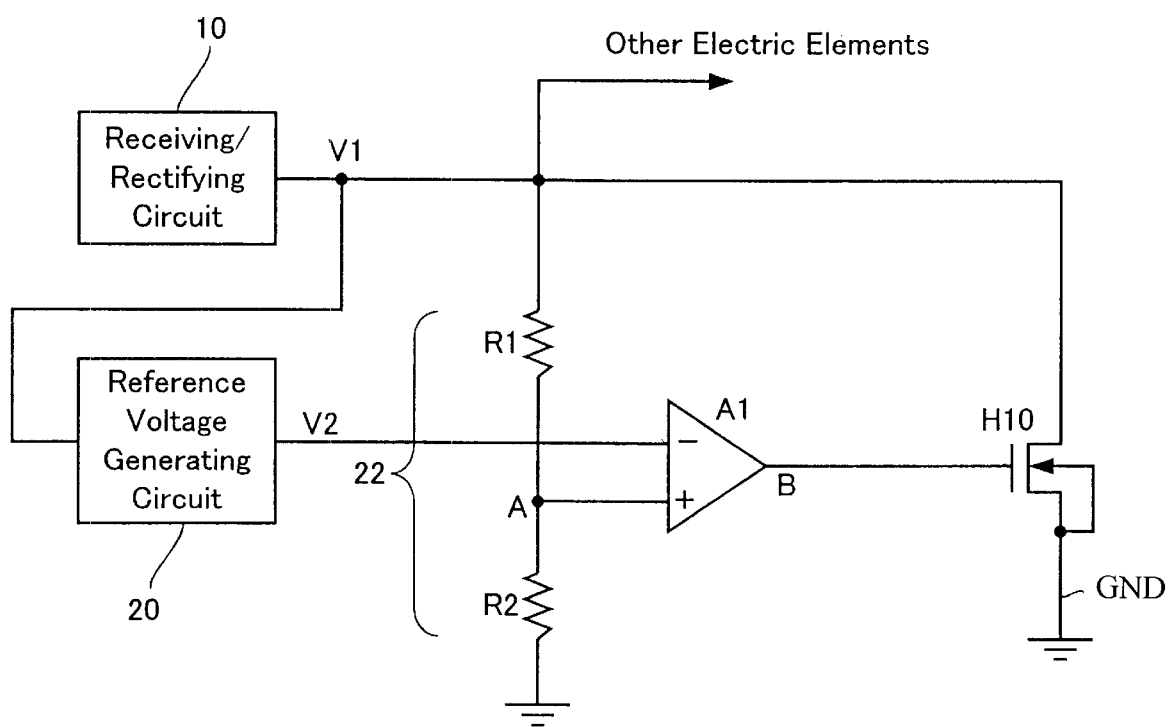
FIG. 2 is a block diagram showing a part of an IC card according to a first preferred embodiment of the present invention.

FIG. 2 shows a part of an IC card according to a first preferred embodiment of the present invention. A clamp circuit (22, A1 and H10) can be used for a contactless interface circuit for contactless data transmission. If the clamp circuit (22, A1 and H10) is used for such an interface circuit, a voltage induced at a coil would be rectified to generate a supply voltage, the voltage induced at the coil would include AM-modulated data signals. The high supply voltage clamp circuit (22, A1 and H10) is connected to the above described receiving/rectifying circuit 10 and to a reference voltage generating circuit 20. The receiving/rectifying circuit 10 is designed to be the same as that in FIG. 1.

The high supply voltage clamp circuit includes a voltage dividing resistance circuit 22; a differential amplifier A1; and an N type MOS transistor H10 for high voltage, which is used as a control circuit. The voltage dividing resistance circuit 22 includes serially connected two resistors R1 and R2, resistor R1 having an end connected directly to the output terminal of the receiving/rectifying circuit 10, and the resistor R2 having an end connected to a ground terminal GND. Resistors R1 and R2, which have the same resistance value and are made of the same material, divide the supply voltage V1, supplied from the receiving/rectifying circuit 10, and adjust the voltage at a dividing point A to be identical to a reference voltage V2 which the supply voltage V1 increases and becomes identical to a clamping voltage (V0). The differential amplifier A1 operates as a decision circuit to detect whether or not the voltage at the dividing point A, which is normally lower than the reference voltage V2, becomes identical to the reference voltage V2.

The N type MOS transistor H10 is connected at a gate to the output terminal of the differential amplifier A1. When the differential amplifier A1 outputs a signal, indicating that the voltage at the dividing point A is identical to the reference voltage V2, the N type MOS transistor H10 regulates or controls the amount of electric current flowing in accordance with the supply voltage V1 so that the supply voltage V1 becomes lower than the breakdown voltage of circuit elements in the IC card. In other words, the N type MOS transistor H10 starts such an operation when the voltage at the dividing point A becomes identical to the reference voltage V2. The breakdown voltage is, for example, 18V.

The differential amplifier A1 includes a first input terminal (+) applied with the voltage at the dividing point A; a second input terminal (−) applied with the reference voltage V2; and an output terminal connected to the gate of the N type MOS transistor H10. The N type MOS transistor H10 is connected at a drain to the receiving/rectifying circuit 10, and at a source to the ground GND.

Figure 3:
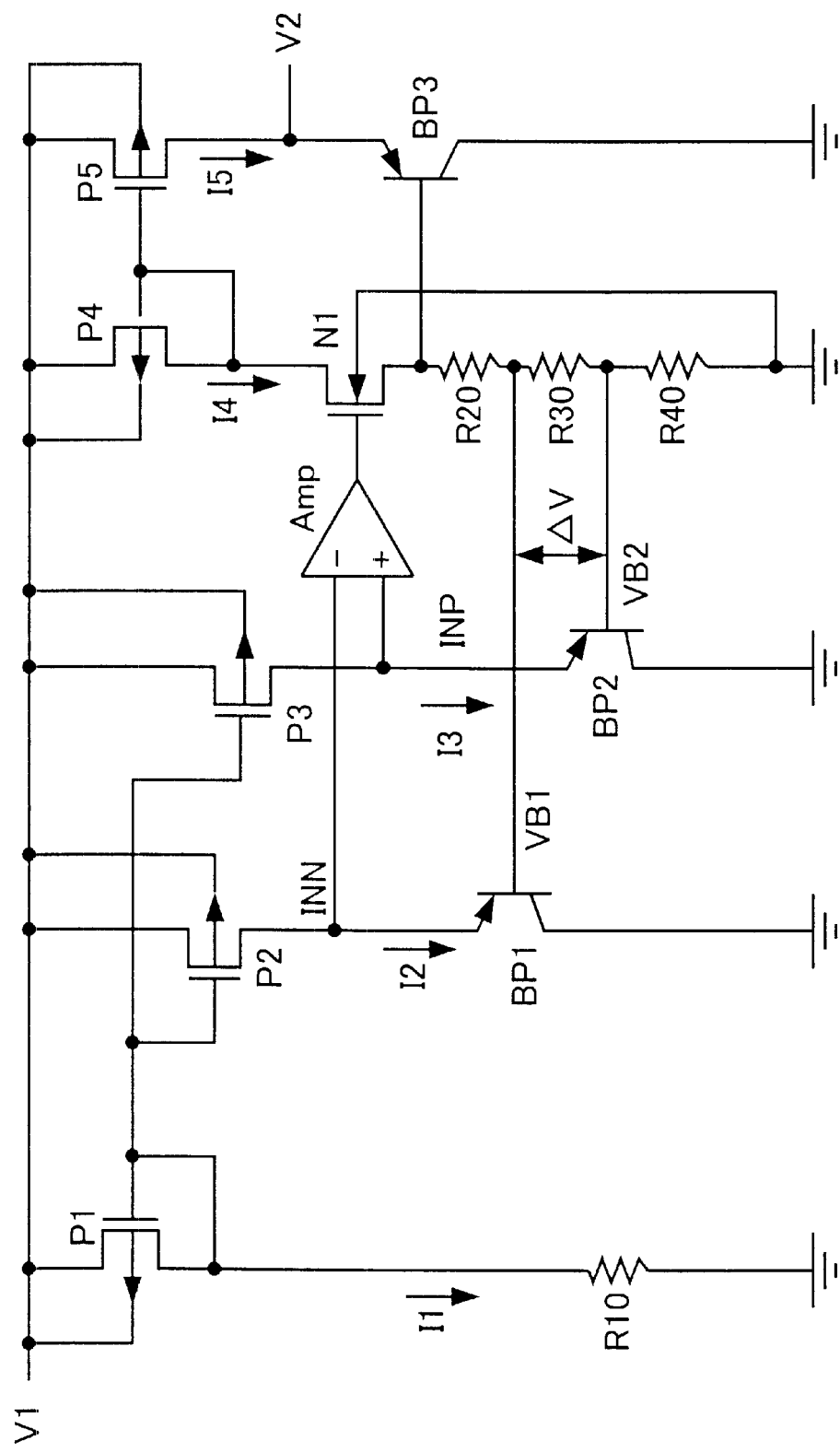
FIG. 3 is a circuit diagram showing a reference voltage generating circuit, used in the IC card shown in FIG. 2.

FIG. 3 shows the reference voltage generating circuit 20, which includes P type MOS transistors P1 to P5; an N type MOS transistor N1; and PNP type bipolar transistors BP1 to BP3. The PNP type bipolar transistors BP1 and BP2 are connected at their bases to nodes VB1 and VB2, respectively. The reference voltage generating circuit 20 further includes resistors R10, R20, R30 and R40 and a differential amplifier Amp. In FIG. 3, reference symbols INN and INP indicate input terminals of the differential amplifier Amp. Although the emitter area ratio between the PNP type bipolar transistors BP1 and BP2 is not limited by a specific value, it is assumed that the ratio BP1:BP2=8:1 in this embodiment. The P type transistors P2 and P3 are designed to be the same in size. Since the supply voltage V1 can be very high, each transistor is preferably replaced by a high voltage type if the transistors are assumed not to be strong enough.

Next, the operation of the first preferred embodiment is described.

As described above, the transmission distance between the coil in the coupler and the coil L in the IC card is shortened, when the voltage to be received by the receiving/rectifying circuit 10 increases. When the voltage received by the receiving/rectifying circuit 10 increases, the supply voltage V1, which is generated by rectifying the received voltage, increases as well.

When the supply voltage V1 increases, electric current I1 starts flowing in the reference voltage generating circuit 20. The resistor R10 defines the amount of the current I1. As the P type transistors P2 and P3 are connected to the P type transistor P1 in the current-mirror manner, the electric currents I2 and I3 flowing through the P type transistors P2 and P3, respectively, are defined by the ratio of size between each of the transistors P2 and P3 and the transistor P1. In this case, as the P type transistors P2 and P3 are the same in size, the currents I2 and I3 are equal.

The differential amplifier Amp, N type MOS transistor N1, resistors R20, R30 and R40 and PNP type bipolar transistors BP1 and BP2 form a loop, so that the potential difference between the nodes INN and INP approaches zero when the supply voltage V1 increases. The emitter area ratio between the PNP type bipolar transistors BP1 and BP2 is one to eight (1:8), so that the potential difference ΔV between the nodes VB1 and VB2 can be calculated in accordance with the following equation:

$$\Delta V = k(T/q) ln 8$$

k: Boltzmann's constant
q: electric charge of electron
T: absolute temperature

It can be understood from the equation that the potential difference ΔV is defined not by the currents I2 and I3, but by the emitter area ratio between the PNP type bipolar transistors BP1 and BP2. When the supply voltage V1 changes, the currents I1, I2 and I3 change as well. However, the potential difference ΔV keeps a constant value without regard to variations If the currents I1, I2 and I3.

Electric current I4 is defined by the potential difference ΔV and the value of the resistor R30, so that the current I4 is not affected by the variation of the supply voltage V1. Electric currents I5 is defined by the transistor P5, which is current-mirror connected to the transistor P4, so that the current I5 is not affected by the variation of the supply voltage V1. As a result, the reference voltage V2, generated from the current I4 and I5, keeps a constant voltage level without regard to variations of the supply voltage V1. The resistors R20, R30 and R40 and bipolar transistor BP3 are used for generating the reference voltage V2 so as to prevent the voltage V2 from being changed with temperature.

When the distance between the coupler and IC card is getting closer and the supply voltage V1 increases, the voltage at the dividing point A increases at a rate defined in accordance with the ratio between the resistors R1 and R2. When the supply voltage V1 does not reach a clamp voltage V0, the voltage at the dividing point A is lower than the reference voltage V2, the level of the node B, which is the output of the differential amplifier A1, is "L", and the transistor H10 is in the OFF state. Therefore, no electric current flows through the transistor H10. On the other hand, electric current flows through the dividing resistance circuit 22. The clamp voltage V0 may be, for example, 10V when the breakdown voltage is, for example, 18V.

Figure 4:
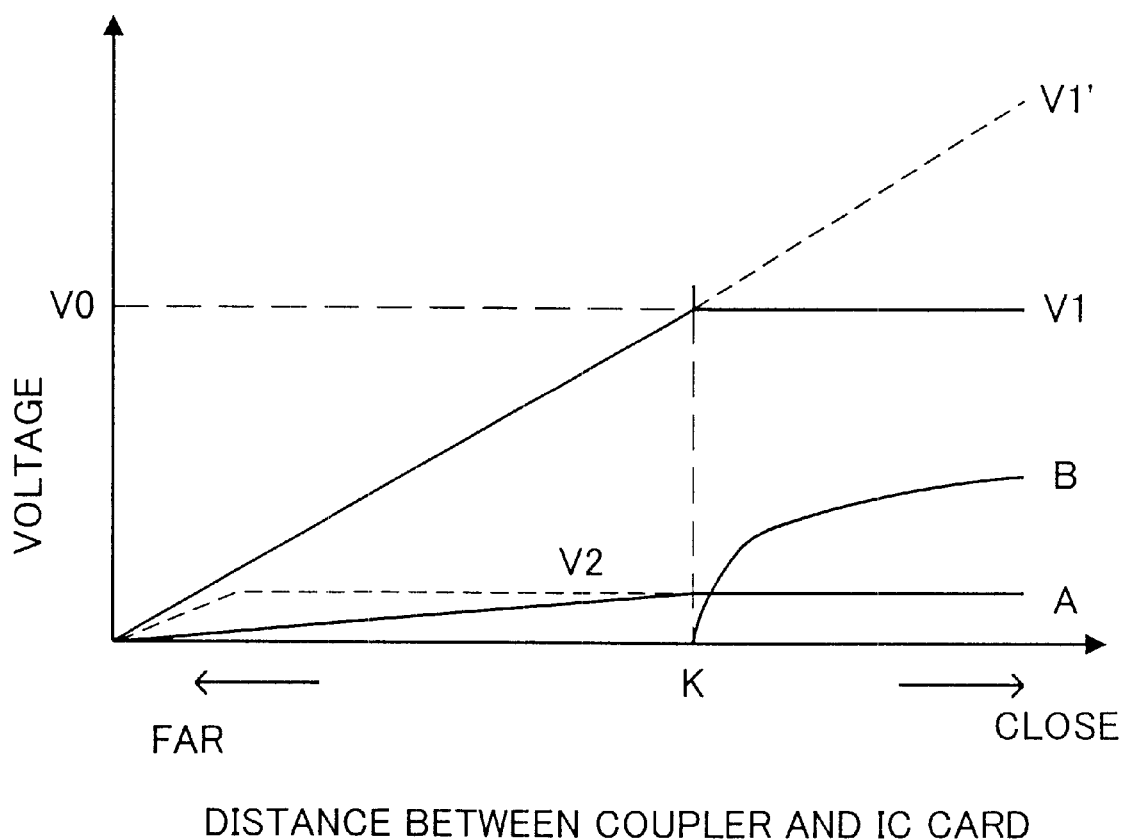
FIG. 4 is a graph showing the operation of the first preferred embodiment.

When the distance between the coupler and IC card becomes "K" shown in FIG. 4, and the supply voltage V1 reaches the clamp voltage V0, the voltage at the dividing point A becomes identical to the reference voltage V2. In this case, the level of the node B, which corresponds to the output of the differential amplifier A1, increases and the transistor H10 turns on. Therefore, electric current flows through the transistor H10, and the clamping operation starts.

As shown in FIG. 2, the high supply voltage clamp circuit according to the first preferred embodiment employs a feedback loop arrangement, therefore, the differential amplifier A1 controls the gate voltage of the transistor H10 so that the supply voltage V1 is maintained at the clamp voltage V0. The amount of current flowing from the receiving/rectifying circuit 10 to the transistor H10 is adjusted so that the supply voltage V1 is maintained at the clamp voltage V0 and the supply voltage V1 never exceeds the clamp voltage V0.

As described above, according to the first preferred embodiment, the dividing resistance circuit 22 is designed to have a resistance value so that the voltage at the dividing point A is identical to the reference voltage V2 when the supply voltage V1 is identical to the clamp voltage V0. When the voltage at the dividing point A increases and becomes identical to the reference voltage V2, the clamping operation starts to control the supply voltage V1 so that it does not exceed the clamp voltage V0.

Even if the sheet resistance of the dividing resistance circuit 22 varies, the voltage at the dividing point A is prevented from being changed, because the voltage at the dividing point A is defined by the ratio of the resistors R1 and R2. As a result the clamping operation can be started accurately at an appropriate timing.

In this embodiment, an N type transistor having a breakdown voltage that is high enough relative to the supply voltage V1 can be used instead of high voltage transistors.

Figure 5:
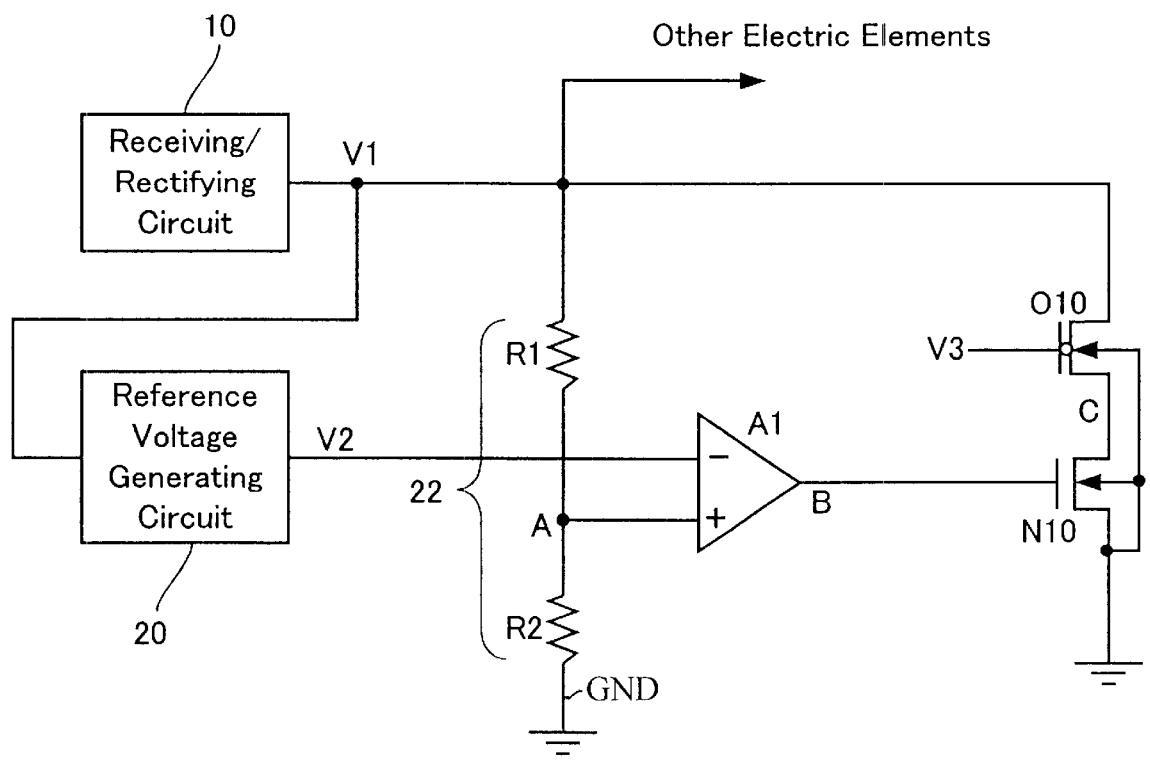
FIG. 5 is a block diagram showing a part of an IC card according to a second preferred embodiment of the present invention.

Next, a second preferred embodiment of the present invention, shown in FIG. 5, is described. In the second preferred embodiment, the same or corresponding elements to those in the first preferred embodiment are represented by the same reference numerals and symbols; and the same description is not repeated.

A high supply voltage clamp circuit according to the second preferred embodiment includes a normal voltage transistor N10 instead of the high voltage transistor H10, used in the first preferred embodiment. The high supply voltage clamp circuit further includes at least one MOS transistor 010, connected between a drain of the normal voltage transistor N10 and the power supply (receiving/ rectifying circuit 10). The MOS transistor 010 reduces voltage supplied from the power supply 10 to the normal voltage transistor N10. In general, the MOS transistor 010 has a threshold voltage that is much lower than an N type MOS transistors, and could be used if it has a breakdown voltage that is high enough relative to the supply voltage V1. The MOS transistor 010 is supplied at a gate with la bias voltage V3, which is high enough to turn on the transistor 010.

Figure 6:
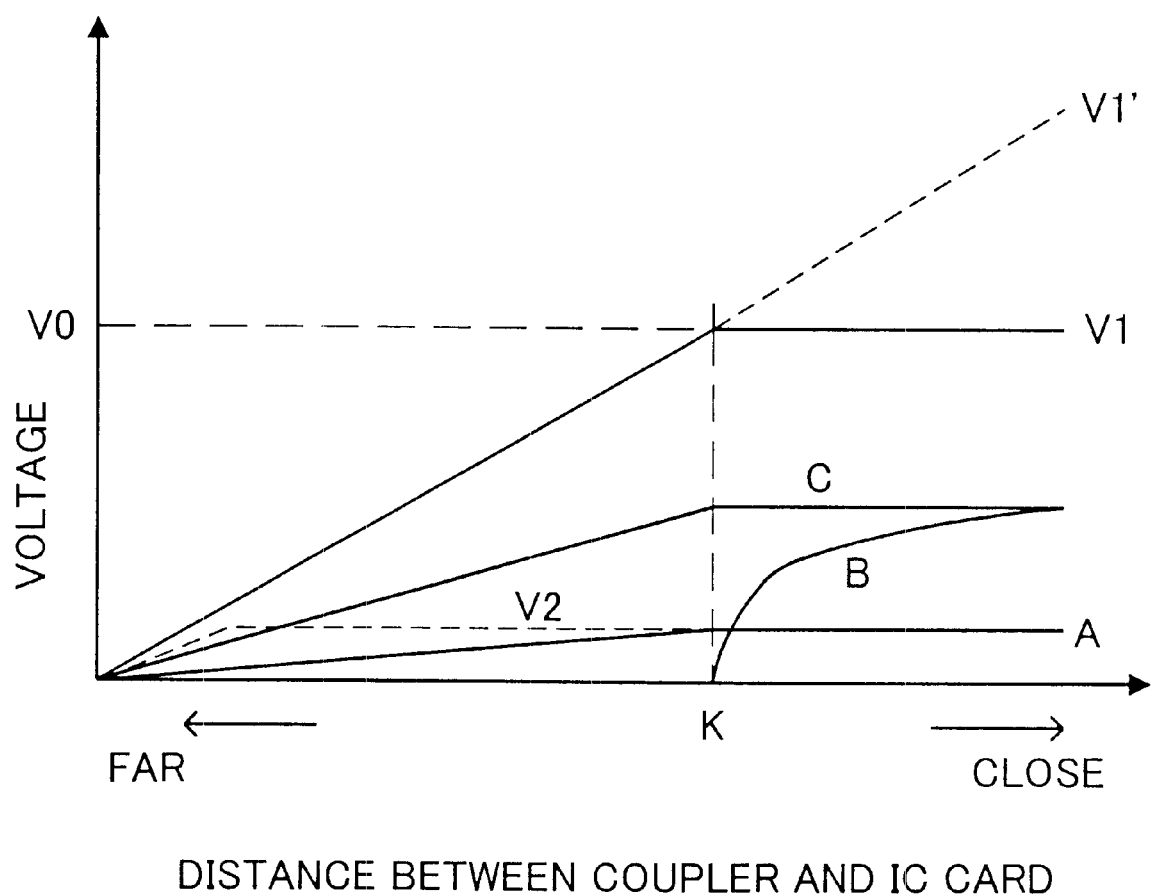
FIG. 6 is a graph showing the operation of the second preferred embodiment.

As shown in FIG. 6, when the supply voltage V1 exceeds the clamp voltage V0, the transistor N10 turns on in response to an output signal of the differential amplifier A1, which is applied to the node B. When the transistor N10 turns on, the clamping operation starts to keep the supply voltage V1 identical to the clamp voltage V0. In accordance with the operation of the transistor 010, a node C is applied with a voltage that is enough lower than the supply voltage V1. Therefore, it is possible that the transistor N10 controls the supply voltage V1 using a drain voltage, which is lower than the supply voltage V1.

According to the second preferred embodiment, at least one MOS transistor 010 is arranged between the drain of the normal voltage transistor N10 and the power supply (receiving/rectifying circuit 10) to decrease the voltage to be applied to the normal voltage transistor N10 As a result, each transistor is applied with a lower voltage; and therefore, the transistors have longer durability.

An N type MOS transistor can be used instead of the lower threshold voltage MOS transistor 010 in order to drop voltage.

Figure 7:
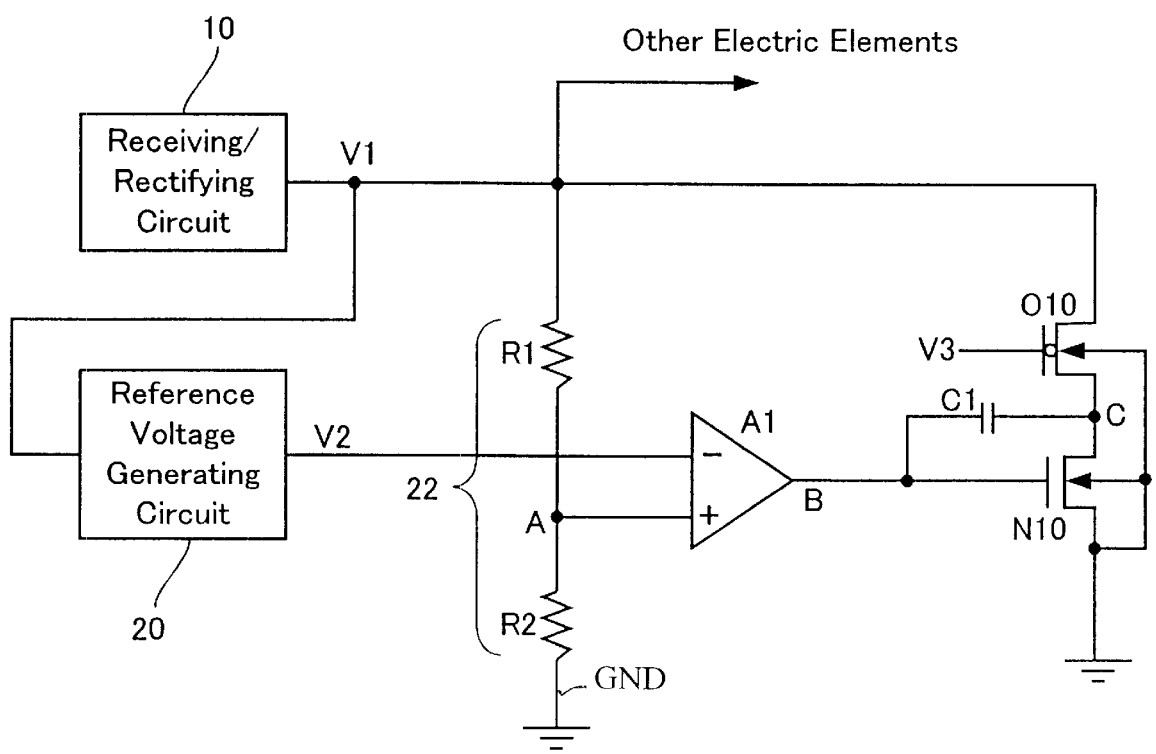
FIG. 7 is a block diagram showing a part of an IC card according to a third preferred embodiment of the present invention.

FIG. 7 shows a part of an IC card according to a third preferred embodiment of the present invention. In FIG. 7, the same or corresponding elements to those in the first and second preferred embodiment are represented by the same reference numerals and symbols; and the same description is not repeated. According to the third embodiment, a clamp circuit further includes a capacitor C1, which is connected between node B and node C.

Figure 8:
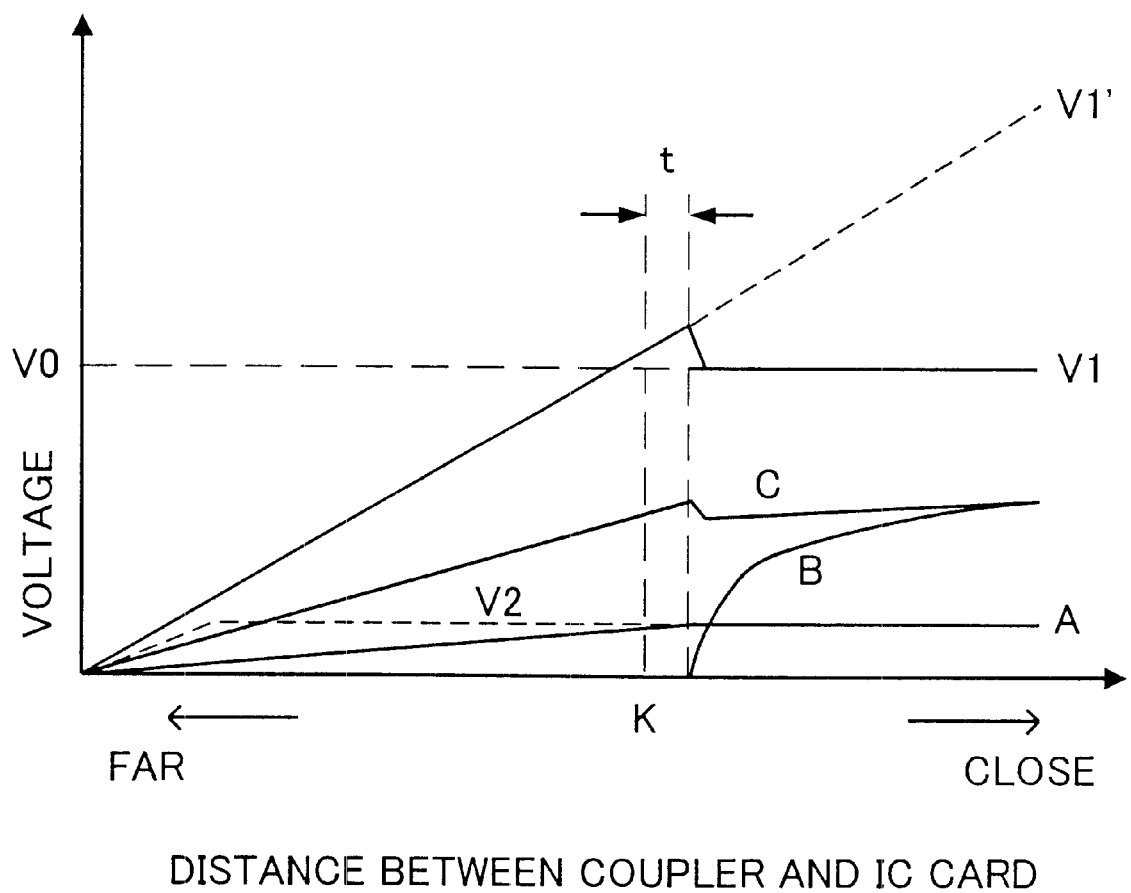
FIG. 8 is a graph showing the operation of the third preferred embodiment.

As shown in FIG. 8, when the supply voltage V1 exceeds (gets over) the clamp voltage V0, the transistor N10 turns on in response to an output signal of the differential amplifier A1, which is applied to the node B. When the transistor N10 turns on, the supply voltage V1 is maintained to be identical to the clamp voltage V0 in the clamping operation or clamping mode. The capacitor C1 is connected between the nodes B and C, so that it takes a time "t" until the transistor N10 turns on. The time "t" depends on the capacity of the capacitor C1. After the time "t", made by the capacitor C1, the transistor N10 turns on and the clamping operation starts.

It is assumed that AM modulated data are included in the voltage induced by a coil, the supply voltage is lower than the clamp voltage, and a voltage that is generated by rectifying the induced voltage is higher than the clamp voltage. In this case, the data can not be detected from the signal voltage induced by the coil.

Accordingly, in the third preferred embodiment, the capacitor C1 is arranged between the gate and drain of the transistor N10, so that the supply voltage V1 increases after the voltage at the dividing point A becomes identical to the reference voltage V2 until a time defined by the capacitor C1. As a result, a data signal included in the voltage, induced by the coil, can be detected.

The capacitor C1 performs phase compensation of the differential amplifier A1, so that the clamp circuit is prevented from generating an oscillation in the feedback loop.

Figure 9:
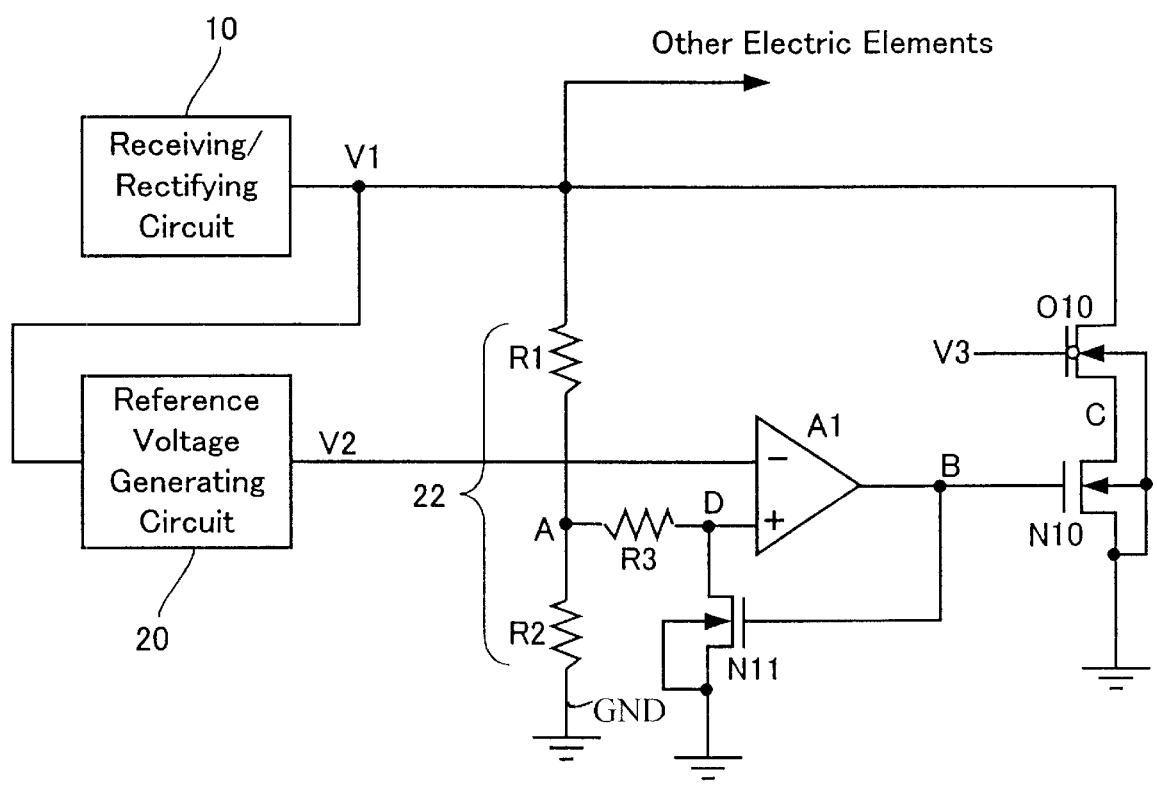
FIG. 9 is a block diagram showing a part of an IC card according to a fourth preferred embodiment of the present invention.

FIG. 9 shows a part of an IC card according to a fourth preferred embodiment of the present invention. The fourth preferred embodiment is similar to the above described second preferred embodiment, and the same or corresponding elements to those in the above described embodiments are represented by the same reference numerals and symbols; and the same description is not repeated. According to the fourth preferred embodiment, a clamp circuit includes an auxiliary resistor R3 between the first input terminal of the differential amplifier A1 and the dividing point A; and an N type MOS transistor N11 functioning as a n auxiliary transistor.

The N type MOS transistor N11 is connected at a drain to a node D and at a gate to a node B. The node D is connected between the auxiliary resistor R3 and the first input terminal of the differential amplifier A1. The node B is connected to an output terminal of the differential amplifier A1. The N type MOS transistor N11 turns on in response to the output of the differential amplifier A.

Figure 10:
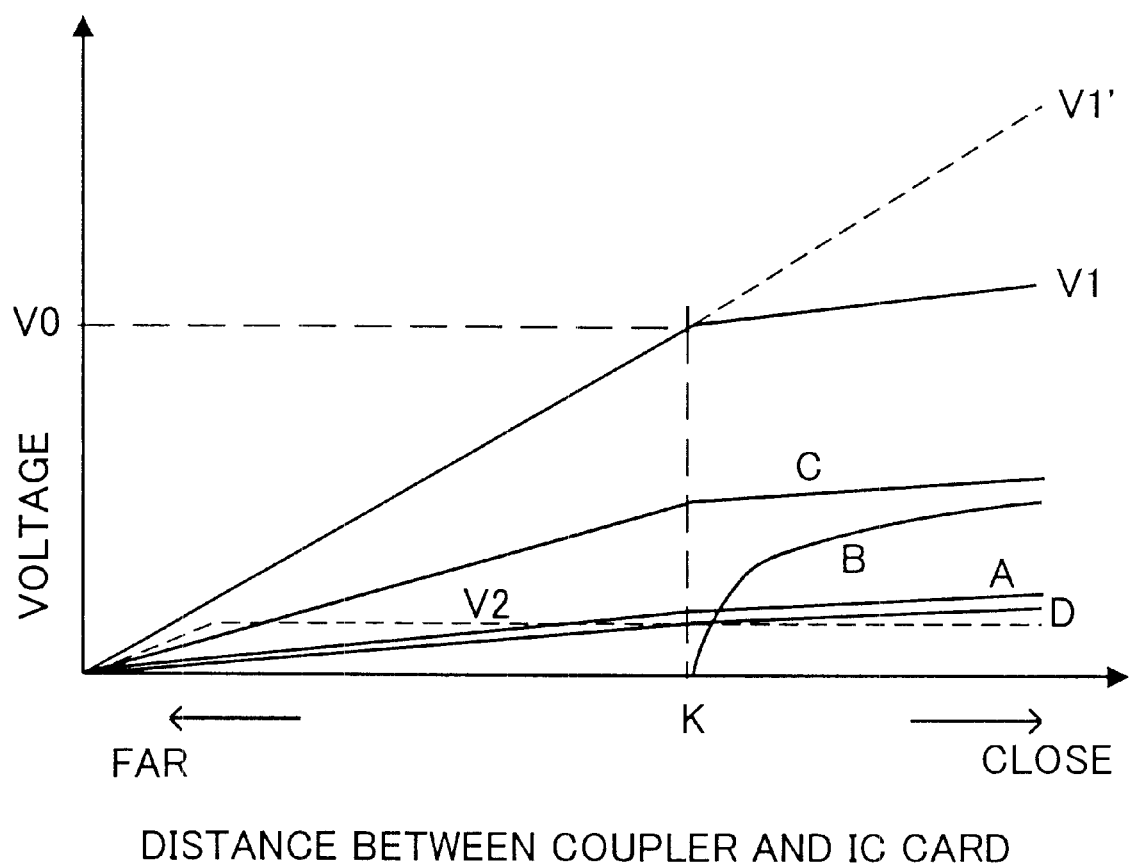
FIG. 10 is a graph showing the operation of the fourth preferred embodiment.

As shown in FIG. 10, when the supply voltage V1 increases, the differential amplifier A1 outputs a low level signal and the transistor N11 is in the off state until the supply voltage V1 reaches the clamp voltage V0. The voltage at the node A gradually increases at a rate defined by the ratio of resistance value between the resistors R1 and Next, when the supply voltage V1 becomes identical to the clamp voltage V0, the voltage at the dividing point A becomes identical to the reference voltage V2, so that no current flows through the resistor R3. As a result, the reference voltage V2, which is identical to the voltage at the dividing point A, is applied to the differential amplifier A1. The voltage at the node B, connected to the output terminal of the differential amplifier A1, increases gradually, and at the same time, the transistor N10 is turning on and some current starts flowing through the transistor N10. At this time, the transistor N11 also turns on, and electric current flows through the resistor R3.

When the supply voltage V1 exceeds the clamp voltage V0 and further increases, the voltage at the node B increases; and therefore, the load of the transistor N11 decreases. As a result, a potential difference is generated between node A and node D, the potential difference becoming larger as the supply voltage becomes higher. The supply voltage V1, after exceeding the clamp voltage V0, increases at a rate determined by the resistor R3 and transistor N11, but does not keep a certain level. The resistor R3 is adjusted so that the supply voltage V1 is lower than the breakdown voltage. Namely, according to the fourth preferred embodiment, the supply voltage V1 increases at a higher rate before reaching the clamp voltage V0 and at a lower rate after reaching the clamp voltage V0.

According to the, fourth preferred embodiment, the supply voltage V1 increases at a certain rate after clamped, so that AM modulation waves for data communication can be added to the supply voltage V1 without the capacitor, used in the third preferred embodiment.

In the circuit layout, the resistors and transistors are small in size as compared with the capacitors and therefore the clamp circuit of the fourth preferred embodiment can be designed smaller than the third preferred embodiment.

Figure 11:
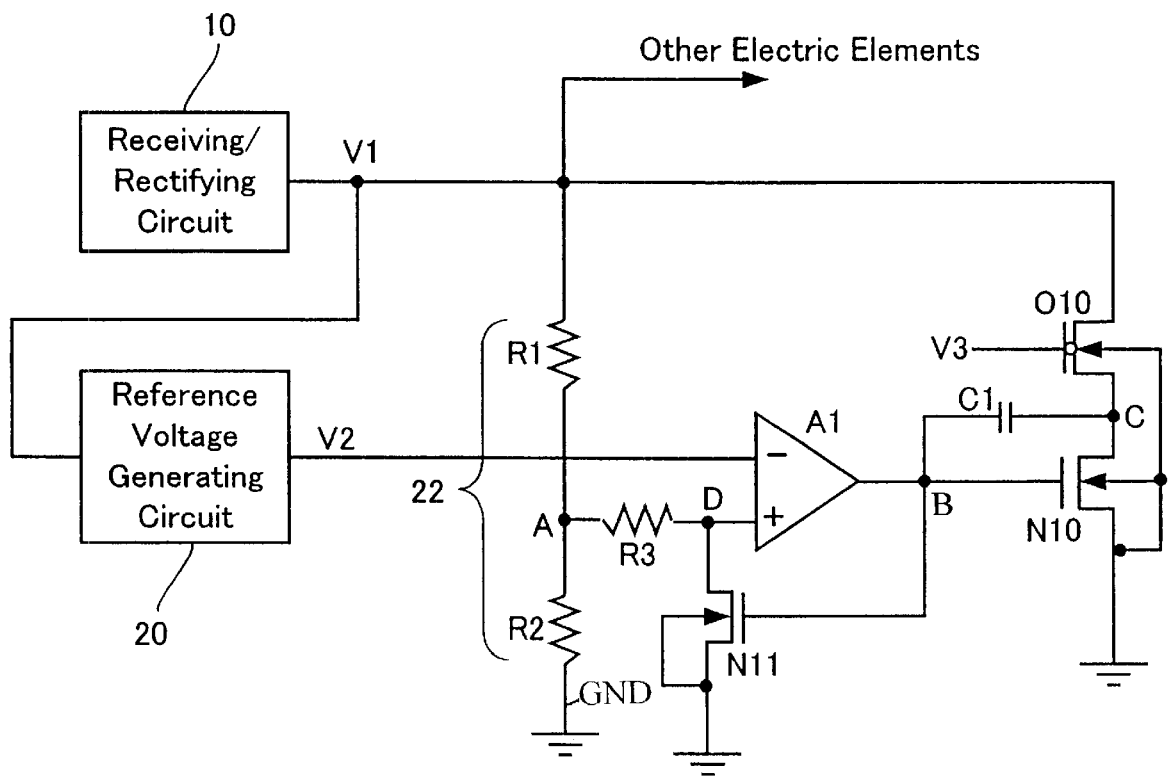
FIG. 11 is a block diagram showing a part of an IC card according to a fifth preferred embodiment of the present invention.
Figure 12:
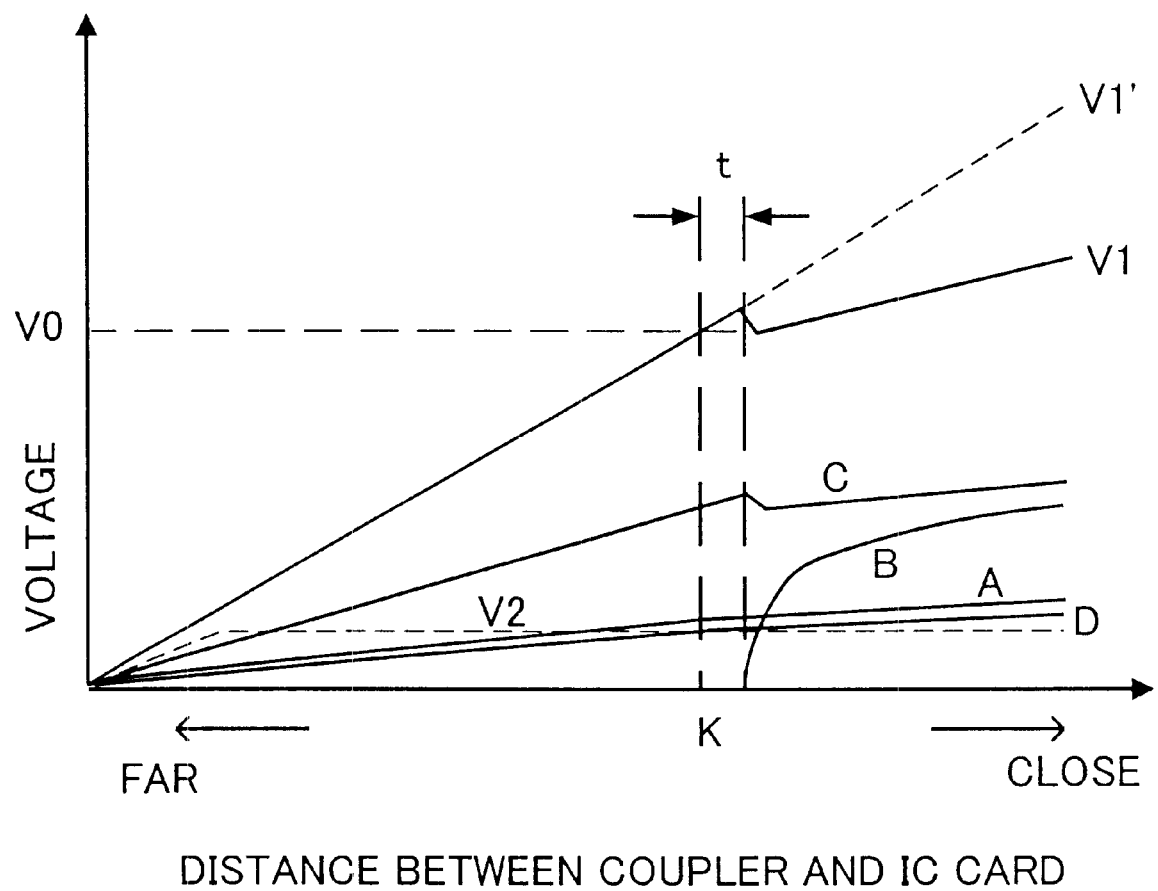
FIG. 12 is a graph showing the operation of the fifth preferred embodiment.

FIG. 11 shows a part of an IC card according to a fifth preferred embodiment of the present invention. The fifth preferred embodiment is similar to the above described fourth preferred embodiment, and the same or corresponding elements to those in the above described embodiment are represented by the same reference numerals and symbols; and the same description is not repeated. According to the fifth preferred embodiment, a clamp circuit includes a capacitor C1 between the node B and node C. The clamp circuit of the fifth preferred embodiment is provided with the feature (capacitor C1) of the third preferred embodiment and the feature (auxiliary resistor R3 and N type MOS transistor N11) of the fourth preferred embodiment. Accordingly, the operation of the fifth embodiment includes both the operations of the third and fourth preferred embodiment, as shown in FIG. 12.

When the supply voltage V1 increases and exceeds the clamp voltage V0, the transistor N10 turns on in response to the voltage at the node B, connected to the output terminal of the differential amplifier A1; and the supply voltage V1 is controlled to be around the clamp voltage V0. In practice, it takes the time "t" until the transistor N10 actually turns on, because the capacitor C1 is arranged between the node B and node C. After such a delay of time "t", the transistor N10 turns on and clamping operation starts.

When the transistor N10 turns on, the transistor N11 turns on as well. Once the supply voltage V1 exceeds the clamp voltage V0, the supply voltage V1 increases at a rate determined in accordance with the operations of the resistor R3 and transistor N11.

Figure 13:
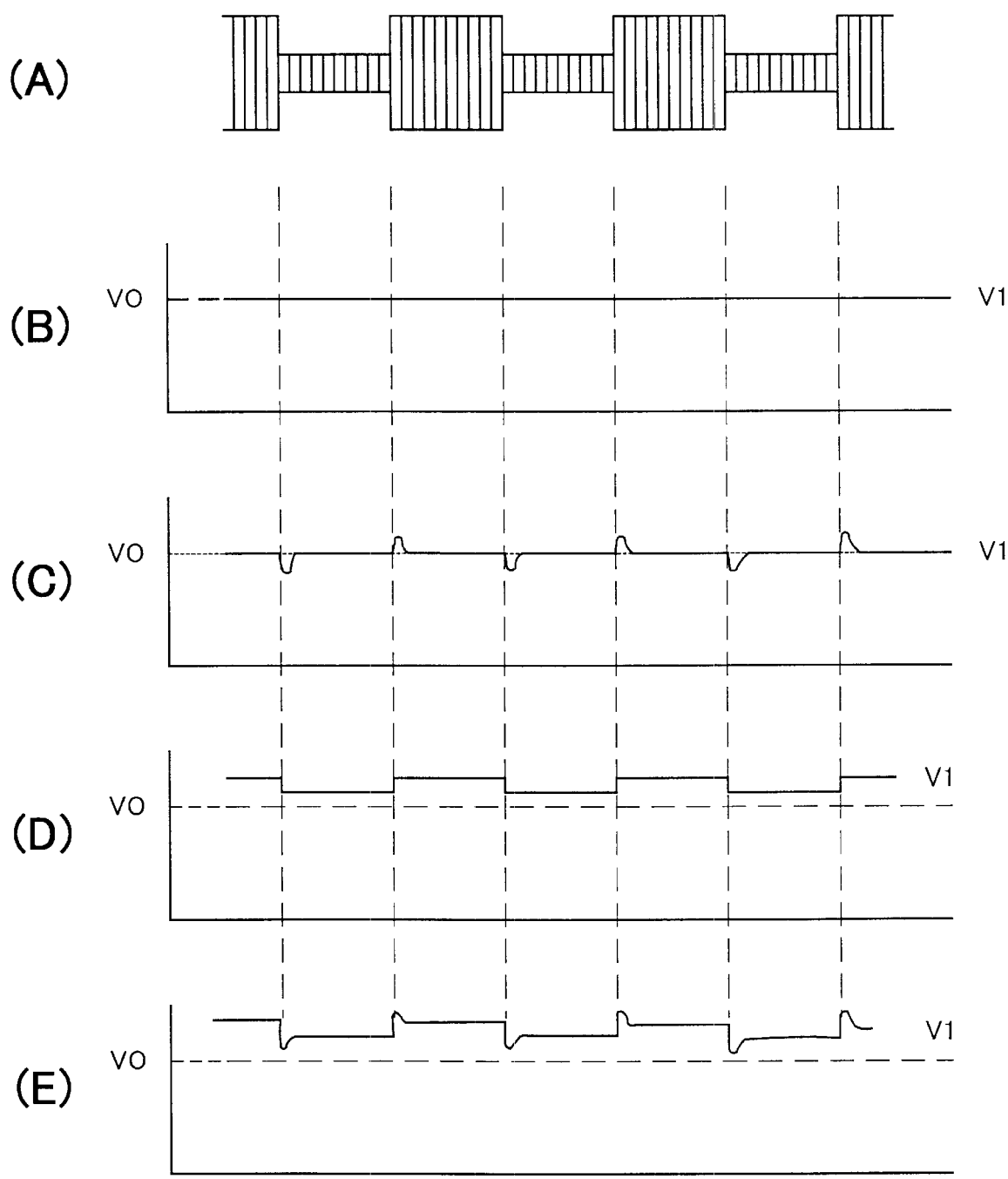
FIG. 13 is a timing chart showing waves of supply voltages, made in clamping operation, according to the first to fifth preferred embodiments.

FIGS. 13(B) to 13(E) show changes of supply voltage (V1) according to the first to fifth preferred embodiments, when AM modulated data are added to a voltage (V1) induced by a coil, as shown in FIG. 13(A).

According to the first and second preferred embodiments, as shown in FIG. 13(B), the supply voltage V1 is controlled not to be over the clamp voltage V0 in the clamping operation (clamping mode). In this case, the AM modulated data can not be detected from the supply voltage V1.

According to the third preferred embodiment, the capacitor C1 is connected between the gate and drain of the transistor N10. As a result, as shown in FIG. 13(C), when the voltage at the dividing point increases and becomes identical to the reference voltage V2, the voltage keeps increasing for a period of time "t". Therefore, the AM modulated data can be detected from the supply voltage V1.

According to the fourth preferred embodiment, as shown in FIG. 13(D), the supply voltage V1 becomes higher than the clamp voltage V0 in clamping operation (clamping mode). Therefore, the AM modulated data can be detected from the supply voltage V1.

According to the fifth preferred embodiment, as shown in FIG. 13(E), waves of the supply voltage V1 are formed by combining the waves of the third and fourth preferred embodiments, shown in FIGS. 13(C) and 13(D).

As described above, according to the present invention, a clamp circuit includes a dividing resistance circuit with resistors that are designed to have optimum values so that the voltage at a dividing point becomes identical to a reference voltage when a supply voltage is identical to a clamp voltage. As a result, a clamping operation can be started accurately even if dividing resistance circuits have different or uneven resistance values among individual clamp circuits. In the clamping operation, the supply voltage is c controlled not to be higher than the breakdown voltage when the voltage at the dividing point increases and reaches the reference voltage.

What is claimed is:

1. A contactless interface circuit for application of a supply voltage to an internal circuit comprising:
   a supply voltage generating circuit which generates the supply voltage, said supply voltage generating circuit including a contactless circuit receiving an alternating voltage and having an output terminal;
   a reference voltage generating circuit connected directly to the output terminal of said supply voltage generating circuit, said reference voltage generating circuit generating a reference voltage determined by the supply voltage;
   a resistance circuit having a first end connected directly to the output terminal of said supply voltage generating circuit and a second end connected to a ground terminal, said resistance circuit consisting of first and second series-connected resistors having a constant fixed resistance value and a dividing point at which the supply voltage is divided, the voltage at said dividing point being identical to the reference voltage when the supply voltage is identical to a predetermined clamp voltage and being determined only by the supply voltage;
   a decision circuit which detects whether the voltage at the dividing point of said resistance circuit reaches the reference voltage; and
   a control circuit connected between the output terminal of said supply voltage generating circuit and said ground terminal, said control circuit responding to an output signal of said decision circuit so as to maintain the supply voltage at a value not exceeding a predetermined breakdown voltage, the supply voltage being controlled and supplied simultaneously to the internal circuit.

2. The contactless interface circuit according to claim 1, wherein
   said control circuit maintains the supply voltage at a value not exceeding the clamp voltage.

3. The contactless interface circuit according to claim 1, wherein said control circuit maintains a rate of increase of the supply voltage at a first rate of increase until the clamp voltage is reached, and at a second rate of increase after the clamp voltage has been reached, said first rate of increase being higher than said second rate of increase.

4. The contactless interface circuit according to claim 1, wherein said first resistor is connected between the output terminal of said supply voltage generating circuit and said dividing point, and said second resistor is connected between said dividing point and said ground terminal.

5. The contactless interface circuit according to claim 4, wherein
   said decision circuit is a differential amplifier having an output terminal, a first input terminal connected to the reference voltage generating circuit, and a second input terminal connected to the dividing point of said resistance circuit.

6. The contactless interface circuit according to claim 5, wherein said control circuit comprises a first transistor having a drain and a gate, the gate of said first transistor being connected to the output terminal of said differential amplifier, whereby an electric current flowing through said first transistor maintains the supply voltage at a value not exceeding said predetermined breakdown voltage when said differential amplifier outputs a signal indicating that the voltage at said dividing point is identical to the reference voltage.

7. The contactless interface circuit according to claim 6, further comprising a capacitor connected between the gate and drain of said first transistor.

8. The contactless interface circuit according to claim 6, further comprising:
   a third resistor interposed between the second input terminal of said differential amplifier and said dividing point; and
   a second transistor having
      drain connected to a node between said third resistor and the second input terminal of said differential amplifier; and
      a gate connected to the output terminal of said differential amplifier.

9. The contactless interface circuit according to claim 6, further comprising:
   a capacitor connected between the gate and drain of said first transistor;
   a third resistor connected between the second input terminal of said differential amplifier and said dividing point; and
   a second transistor having
      a drain connected to a node between said third resistor and the second input terminal of said differential amplifier; and
      a gate connected to the output terminal of said differential amplifier.

10. A method for clamping a supply voltage provided at an output of a supply voltage generating circuit, including a contactless circuit receiving an alternating voltage, for application of the supply voltage to an internal circuit, comprising the steps of:
   providing a reference voltage generating circuit connected directly to the output terminal of said supply voltage generating circuit, said reference voltage generating circuit generating a reference voltage determined by the supply voltage;
   connecting a voltage divider directly across the output of the supply voltage generating circuit to provide a divided supply voltage, said voltage divider consisting of first and second series-connected resistors, each of said resistors having a constant fixed resistance value, the divided supply voltage at a junction of said first and second series-connected resistors being determined only by the supply voltage;
   comparing the divided supply voltage with the reference voltage; and
   controlling the supply voltage based on the result of said comparison to maintain the supply voltage at a value not exceeding a predetermined breakdown voltage, the supply voltage being controlled and supplied simultaneously to the internal circuit.

11. The method according to claim 10, wherein the supply voltage does not exceed a predetermined clamp voltage.

12. The method according to claim 10, wherein the supply voltage is controlled so that the supply voltage increases at a first rate of increase until a predetermined clamp voltage has been reached, and at a second rate of increase after the clamp voltage has been reached, said first rate of increase being higher than said second rate of increase.

13. The method according to claim 10, comprising the further step of providing a delay time when the supply voltage is controlled to be identical to a predetermined clamp voltage.

14. A contactless IC card, including a contactless interface circuit for application of a supply voltage to an internal circuit, the contactless interface circuit comprising:

(1) a supply voltage generating circuit including a contactless circuit receiving an alternating voltage and having an output terminal, said supply voltage generating circuit including a rectifying circuit which rectifies an induced voltage, representing a component of an AM modulated data signal for generation of the supply voltage;

(2) a reference voltage generating circuit connected directly to the output terminal of said supply voltage generating circuit, said reference voltage generating circuit generating a reference voltage determined by the supply voltage;

(3) a resistance circuit having a first end connected directly to the output terminal of said supply voltage generating circuit and a second end connected to a ground terminal, said resistance circuit consisting of first and second series-connected resistors each having a constant fixed resistance value and being provided with a dividing point at which the supply voltage is divided, the voltage at said dividing point being identical to the reference voltage when the supply voltage is identical to a predetermined clamp voltage and being determined only by the supply voltage;

(4) a decision circuit which detects whether the voltage at said dividing point in the resistance circuit reaches the reference voltage; and (5) a control circuit connected between the output terminal of said supply voltage generating circuit and said ground terminal, said control circuit responding to an output signal of said decision circuit so as to maintain the supply voltage at a value not exceeding a predetermined breakdown voltage, said supply voltage being controlled and supplied simultaneously to the internal circuit.

15. The contactless IC card according to claim 14, wherein said control circuit maintains the supply voltage at a value not exceeding the clamp voltage.

16. The contactless IC card according to claim 14, wherein said control circuit maintains a rate of increase of the supply voltage at a first rate of increase until the clamp voltage is reached, and at a second rate of increase after the clamp voltage has been reached, said first rate of increase being higher than said second rate of increase.

17. The contactless IC card according to claim 14, wherein said first resistor is connected between the output terminal of said supply voltage generating circuit and said dividing point, and said second resistor is connected between said dividing point and said ground terminal.

18. The contactless IC card according to claim 17, wherein said decision circuit is a differential amplifier having an output terminal, a first input terminal connected to the reference voltage generating circuit, and a second input terminal connected to the dividing point of said resistance circuit.

19. The contactless IC card according to claim 18, wherein said control circuit comprises a first transistor having a drain and a gate, the gate of said first transistor being connected to the output terminal of said differential amplifier, whereby an electric current flowing through said first transistor maintains the supply voltage at a value not exceeding said predetermined breakdown voltage when said differential amplifier outputs a signal indicating that the voltage at said dividing point is identical to the reference voltage.

20. The contactless IC card according to claim 19, wherein the interface circuit further comprises a voltage drop circuit interposed between the drain of the first transistor and the output terminal of said supply voltage generating circuit, said voltage drop circuit reducing the voltage applied to said first transistor.

21. The contactless IC card according to claim 20, wherein the voltage drop circuit comprises a MOS type transistor.

22. The contactless IC card according to claim 19, wherein the interface circuit further comprises a capacitor connected between the gate and drain of said first transistor.

23. The contactless IC card according to claim 18, wherein the interface circuit further comprises:
   a third resistor interposed between the second input terminal of said differential amplifier and said dividing point; and
   a second transistor having
      a drain connected to a node between said third resistor and the second input terminal of said differential amplifier; and
      a gate connected to the output terminal of said differential amplifier.

24. The contactless IC card according to claim 19, wherein the interface circuit further comprises
   a capacitor connected between the gate and drain of the first transistor;
   a third resistor connected between the second input terminal of said differential amplifier and said dividing point; and
   a second transistor having
      a drain connected to a node between said third resistor and the second input terminal of said, differential amplifier; and
      a gate connected to the output terminal of said differential amplifier.

25. A contactless interface circuit for application of a supply voltage to an internal circuit comprising:
   a supply voltage generating circuit which generates the supply voltage, said supply voltage generating circuit having an output terminal;
   a reference voltage generating circuit which generates a predetermined reference voltage;
   a resistance circuit comprising serially connected first and second resistors, said first resistor being connected directly to the output terminal of said supply voltage generating circuit and a dividing point at which the supply voltage is divided, and the second resistor being connected between said dividing point and a ground terminal, each of said first and second resistors having a fixed constant resistance value, the voltage at said dividing point being identical to the reference voltage when the supply voltage is identical to a predetermined clamp voltage and being determined only by the supply voltage;
   a decision circuit which detects whether the voltage at said dividing point in the resistance circuit reaches the reference voltage, said decision circuit being a differential amplifier having an output terminal, a first input terminal connected to the reference voltage generating circuit, and a second input terminal connected to the dividing point of said resistance circuit;
   a control circuit connected between the output terminal of said supply voltage generating circuit and said ground terminal, said control circuit comprising a first transistor having a gate connected to the output terminal of said differential amplifier and responding to an output signal of said decision circuit, whereby an electric current flows through said first transistor to maintain the supply voltage at a value not exceeding said predetermined breakdown voltage when said differential amplifier outputs a signal indicating that the voltage at said dividing point is identical to the reference voltage, said supply voltage being controlled and supplied simultaneously to the internal circuit; and
   a voltage drop circuit interposed between a drain of the first transistor and the output terminal of said supply voltage generating circuit, said voltage drop circuit reducing the voltage applied to said first transistor.

26. A contactless interface circuit according to claim 25, wherein the voltage drop circuit is a MOS transistor.

27. A contactless interface circuit according to claim 1, wherein said decision circuit comprises a differential amplifier having an output terminal, a first input terminal that is coupled to said reference voltage generating circuit, and a second input terminal,
   wherein said control circuit comprises a first transistor that is connected in a circuit path between the output terminal of said supply voltage generating circuit and the ground terminal, said first transistor having a gate that is connected to the output terminal of said differential amplifier, whereby an electric current flowing through said first transistor maintains the supply voltage at a value not exceeding the predetermined breakdown voltage when said differential amplifier outputs a signal indicating that the voltage at the dividing point is substantially identical to the reference voltage, and
   wherein said contactless interface circuit further comprises a third resistor connected between the second input terminal of said differential amplifier and the dividing point of said first and second input terminal of said differential amplifier and having a gate that is connected to the output terminal of said differential amplifier.

28. A contactless interface circuit according to claim 1, wherein said contactless interface circuit and said internal circuit are internally contained in a contactless IC card.

29. A contactless interface circuit according to claim 10, wherein the step of comparing the divided supply voltage with the reference voltage is conducted by circuitry that includes a third resistor, a transistor having a source/drain path and also having a gate, and a comparing circuit having first and second input terminals and an output terminal that outputs said result of said comparison, the first input terminal of the comparing circuit being receiving the reference voltage, the second input terminal of the series-connected resistors and also being connected via said source/drain path to a ground terminal, and the gate of said transistor being connected to the output terminal of said comparing circuit.

30. A contactless interface circuit according to claim 10, wherein said voltage generating circuit, said voltage divider, and said internal circuit are internally contained in a contactless IC card.

31. A contactless interface circuit according to claim 14, wherein said contactless interface circuit further comprises a third resistor and a transistor having a source/drain path and also having a gate, and
   wherein said decision cirucit comprises a comparing circuit having first and second input terminals and an output terminal that is connected to the gate of said transistor, the output terminal providing the output signal of said decision circuit, the first input terminal receiving the reference voltage, and the second input terminal being connected via the third resistor to the dividing point of said first and second resistors and also being connected via the source/drain path of said transistor to said ground terminal.

32. A contactless interface circuit according to claim 14, wherein said supply voltage generating circuit, said reference voltage generating circuit, said resistance circuit, said decision circuit, said control circuit, and said internal circuit are internally contained in a contactless IC card.

33. A contactless interface circuit according to claim 25, wherein said contactless interface circuit further comprises a third resisor and a second transistor having a source/drain path and also having a gate, said second input terminal being connected to the diving point of said resistance circuit via said third resistor and being connected to said ground terminal via said source/drain path of said second transistor, the gate of said second transistor being connected to the output terminal of said decision circuit.

34. A contactless interface circuit according to claim 25, wherein said supply voltage generating circuit, said reference voltage generating circuit, said resistance circuit, said decision circuit, said control circuit, and said internal circuit are internally contained in a contactless IC card.

* * * * *